(12) United States Patent
Duluk, Jr. et al.

(10) Patent No.: US 11,487,673 B2
(45) Date of Patent: Nov. 1, 2022

(54) FAULT BUFFER FOR TRACKING PAGE FAULTS IN UNIFIED VIRTUAL MEMORY SYSTEM

(71) Applicant: NVIDIA Corporation, Santa Clara, CA (US)

(72) Inventors: Jerome F. Duluk, Jr., Palo Alto, CA (US); Cameron Buschardt, Round Rock, TX (US); Sherry Cheung, San Jose, CA (US); James Leroy Deming, Madison, AL (US); Samuel H. Duncan, Arlington, MA (US); Lucien Dunning, Santa Clara, CA (US); Robert George, Austin, TX (US); Arvind Gopalakrishnan, San Jose, CA (US); Mark Hairgrove, San Jose, CA (US); Chenghuan Jia, Fremont, CA (US); John Mashey, Portola Valley, CA (US)

(73) Assignee: NVIDIA Corporation, Santa Clara, CA (US)

( * ) Notice: Subject to any disclaimer, the term of this patent is extended or adjusted under 35 U.S.C. 154(b) by 370 days.

(21) Appl. No.: 14/055,345

(22) Filed: Oct. 16, 2013

(65) Prior Publication Data
US 2014/0281296 A1   Sep. 18, 2014
US 2017/0286198 A9   Oct. 5, 2017

Related U.S. Application Data

(60) Provisional application No. 61/782,349, filed on Mar. 14, 2013, provisional application No. 61/800,004, filed on Mar. 15, 2013.

(51) Int. Cl.
*G06F 13/12*   (2006.01)
*G06F 13/38*   (2006.01)
(Continued)

(52) U.S. Cl.
CPC ........ *G06F 12/1009* (2013.01); *G06F 11/073* (2013.01); *G06F 11/0793* (2013.01);
(Continued)

(58) Field of Classification Search
CPC .... G06F 11/073; G06F 12/12; G06F 11/0793; G06F 12/08; G06F 12/1009
(Continued)

(56) References Cited

U.S. PATENT DOCUMENTS

| 4,638,426 A | 1/1987 | Chang et al. |
| 5,063,497 A | 11/1991 | Cutler et al. |

(Continued)

FOREIGN PATENT DOCUMENTS

| CN | 1186720 C | 1/2005 |
| CN | 101916181 A | 12/2010 |

(Continued)

OTHER PUBLICATIONS

Craigon, "Memory Systems and Pipelined Processors", Jones and Bartlett Publishers, Inc., 1996, pp. 124-131.
(Continued)

*Primary Examiner* — Chun Kuan Lee
(74) *Attorney, Agent, or Firm* — Artegis Law Group, LLP

(57) ABSTRACT

A system for managing virtual memory. The system includes a first processing unit configured to execute a first operation that references a first virtual memory address. The system also includes a first memory management unit (MMU) associated with the first processing unit and configured to generate a first page fault upon determining that a first page table that is stored in a first memory unit associated with the first processing unit does not include a mapping corresponding to the first virtual memory address. The system further includes a first copy engine associated with the first processing unit. The first copy engine is configured to read a
(Continued)

first command queue to determine a first mapping that corresponds to the first virtual memory address and is included in a first page state directory. The first copy engine is also configured to update the first page table to include the first mapping.

20 Claims, 11 Drawing Sheets

(51) Int. Cl.
- *G06F 12/1009* (2016.01)
- *G06F 12/109* (2016.01)
- *G06F 12/1072* (2016.01)
- *G06F 12/08* (2016.01)
- *G06F 11/07* (2006.01)
- *G06F 12/12* (2016.01)
- *G06F 12/10* (2016.01)

(52) U.S. Cl.
CPC .............. *G06F 12/08* (2013.01); *G06F 12/109* (2013.01); *G06F 12/1072* (2013.01); *G06F 12/12* (2013.01); *G06F 12/10* (2013.01); *G06F 2212/1016* (2013.01)

(58) Field of Classification Search
USPC .......................................................... 710/62
See application file for complete search history.

(56) References Cited

U.S. PATENT DOCUMENTS

| | | | |
|---|---|---|---|
| 6,073,226 A | 6/2000 | Cutshall et al. | |
| 6,105,113 A * | 8/2000 | Schimmel | G06F 12/1027 711/144 |
| 6,199,141 B1 | 3/2001 | Weinreb | |
| 6,286,092 B1 | 9/2001 | Frank et al. | |
| 6,446,034 B1 | 9/2002 | Egolf | |
| 6,553,507 B1 * | 4/2003 | Cohen | G06F 8/65 717/173 |
| 6,931,840 B2 | 11/2005 | Fleming et al. | |
| 6,961,840 B2 * | 11/2005 | Fleming | G06F 12/1018 711/202 |
| 7,073,043 B2 | 7/2006 | Arimilli et al. | |
| 7,623,134 B1 * | 11/2009 | Danilak | G06F 12/08 345/537 |
| 8,531,417 B2 | 9/2013 | Griffin | |
| 8,531,471 B2 | 9/2013 | Chen et al. | |
| 9,424,201 B2 | 8/2016 | Duluk, Jr. et al. | |
| 9,430,400 B2 | 8/2016 | Duluk, Jr. | |
| 9,575,892 B2 | 2/2017 | Deming et al. | |
| 9,639,474 B2 | 5/2017 | Duluk, Jr. et al. | |
| 2003/0061459 A1 | 3/2003 | Aboulenein et al. | |
| 2004/0064672 A1 | 4/2004 | Fleming et al. | |
| 2006/0069899 A1 | 3/2006 | Schoinas et al. | |
| 2006/0070065 A1 | 3/2006 | Zimmer et al. | |
| 2007/0283115 A1 | 12/2007 | Freeman et al. | |
| 2007/0283123 A1 | 12/2007 | Vick et al. | |
| 2007/0283124 A1 | 12/2007 | Menczak et al. | |
| 2007/0283125 A1 | 12/2007 | Manczak et al. | |
| 2008/0005546 A1 | 1/2008 | Wang et al. | |
| 2009/0006714 A1 | 1/2009 | Durham et al. | |
| 2009/0217377 A1 | 8/2009 | Arbaugh et al. | |
| 2009/0228743 A1 | 9/2009 | Ponnuswamy | |
| 2009/0300267 A1 * | 12/2009 | Schneider | G06F 12/0862 711/E12.001 |
| 2010/0318845 A1 | 12/2010 | Kohiga | |
| 2010/0321397 A1 | 12/2010 | Ginzburg | |
| 2011/0016290 A1 | 1/2011 | Chobotaro et al. | |
| 2011/0023027 A1 | 1/2011 | Kegel et al. | |
| 2011/0072235 A1 * | 3/2011 | Deming | G06F 12/1027 711/207 |
| 2011/0087822 A1 | 4/2011 | Bennett et al. | |
| 2011/0161619 A1 | 6/2011 | Kaminski et al. | |
| 2011/0161620 A1 | 6/2011 | Kaminski et al. | |
| 2011/0191539 A1 | 8/2011 | Hugosson et al. | |
| 2012/0017063 A1 | 1/2012 | Hummel et al. | |
| 2012/0194524 A1 * | 8/2012 | Hartog | G06T 1/20 345/501 |
| 2012/0200579 A1 | 8/2012 | Hartog et al. | |
| 2013/0232315 A1 | 5/2013 | Tian | |
| 2013/0159664 A1 | 6/2013 | Binzer et al. | |
| 2013/0173883 A1 | 7/2013 | Cho et al. | |
| 2013/0135341 A1 | 9/2013 | Seetharamaiah | |
| 2013/0268804 A1 * | 10/2013 | Ronen | G06F 9/542 714/10 |
| 2014/0049548 A1 | 2/2014 | Rao et al. | |
| 2014/0075060 A1 * | 3/2014 | Sharp | G06T 1/60 710/57 |
| 2014/0156930 A1 | 6/2014 | Isloorkar | |
| 2014/0164676 A1 | 6/2014 | Borchers et al. | |
| 2014/0267334 A1 | 9/2014 | Duluk, Jr. et al. | |
| 2014/0281110 A1 | 9/2014 | Duluk, Jr. et al. | |
| 2014/0281256 A1 | 9/2014 | Duluk, Jr. et al. | |
| 2014/0281263 A1 | 9/2014 | Deming et al. | |
| 2014/0281264 A1 | 9/2014 | Duluk, Jr. et al. | |
| 2014/0281296 A1 | 9/2014 | Duluk, Jr. et al. | |
| 2014/0281297 A1 | 9/2014 | Duluk, Jr. et al. | |
| 2014/0281299 A1 | 9/2014 | Duluk, Jr. et al. | |
| 2014/0281323 A1 | 9/2014 | Duluk, Jr. | |
| 2014/0281324 A1 | 9/2014 | Duluk, Jr. et al. | |
| 2014/0281356 A1 | 9/2014 | Buschardt et al. | |
| 2014/0281357 A1 | 9/2014 | Duluk, Jr. et al. | |
| 2014/0281358 A1 | 9/2014 | Duluk, Jr. et al. | |
| 2014/0281364 A1 | 9/2014 | Buschardt et al. | |
| 2014/0304559 A1 * | 10/2014 | Ginzburg | G06F 9/30036 714/57 |
| 2015/0067296 A1 | 3/2015 | Basu et al. | |
| 2016/0275016 A1 | 9/2016 | Mukherjee | |
| 2017/0075818 A1 | 3/2017 | Liu et al. | |

FOREIGN PATENT DOCUMENTS

| | | |
|---|---|---|
| TW | 574646 B | 2/2001 |
| TW | 554287 B | 9/2003 |
| TW | 573253 B | 1/2004 |
| TW | 200611126 B | 4/2004 |
| TW | 200611126 | 4/2006 |

OTHER PUBLICATIONS

Ko et al., Shared Page Table: Sharing of Virtual Memory Resources, IEICE Trans. Inf. & Syst., vol. E86-D, No. Jan. 1, 2003, pp. 43-55.
Non-Final Office Action for U.S. Appl. No. 14/055,318 dated Mar. 13, 2015.
"Page table" article from Wikipedia, archived from Jan. 1, 2013.
Settlemyer, "A study of client-based caching for parallel I/O," Aug. 2009, 182 pages.
Non-Final Office Action for U.S. Appl. No. 14/055,382, dated Dec. 10, 2015.
Non-Final Office Action for U.S. Appl. No. 14/055,356, dated Dec. 4, 2015.
Non-Final Office Action for U.S. Appl. No. 14/055,318, dated Aug. 18, 2016.
Non-Final Office Action for U.S. Appl. No. 14/055,367 dated Sep. 21, 2016.
Final Office Action received for U.S. Appl. No. 14/055,318 dated Sep. 2, 2015, 30 pages.
Notice of Allowance received for U.S. Appl. No. 14/055,318 dated May 10, 2017, 24 pages.
Final Office Action received for U.S. Appl. No. 14/055,356 dated May 11, 2016, 18 pages.
Non Final Office Action received for U.S. Appl. No. 14/055,356 dated Jun. 13, 2017, 19 pages.
Final Office Action received for U.S. Appl. No. 14/055,356 dated Oct. 24, 2017, 12 pages.
Non Final Office Action received for U.S. Appl. No. 14/055,356 dated May 31, 2018, 13 pages.

(56) References Cited

OTHER PUBLICATIONS

Final Office Action received for U.S. Appl. No. 14/055,356 dated Oct. 16, 2018,13 pages.
Notice of Allowance received for U.S. Appl. No. 14/055,356 dated Jun. 4, 2019, 12 pages.
Non Final Office Action received for U.S. Appl. No. 14/055,318 dated Aug. 18, 2016, 33 pages.
Final Office Action received for U.S. Appl. No. 14/055,367 dated Aug. 8, 2017,19 pages.
Notice of Allowance received for U.S. Appl. No. 14/055,367 dated Mar. 26, 2018, 8 pages.
Final Office Action received for U.S. Appl. No. 14/055,382, dated May 11, 2016, 16 pages.
Non Final Office Action received for U.S. Appl. No. 14/055,382, dated May 24, 2017, 21 pages.
Final Office Action received for U.S. Appl. No. 14/055,382, dated Oct. 13, 2017, 14 pages.
Non Final Office Action received for U.S. Appl. No. 14/055,382, dated May 25, 2018, 14 pages.
Final Office Action received for U.S. Appl. No. 14/055,382, dated Oct. 1, 2018,15 pages.
Notice of Allowance received for U.S. Appl. No. 14/055,382, dated Jan. 15, 2019, 7 pages.

* cited by examiner

FAULT BUFFER FOR TRACKING PAGE FAULTS IN UNIFIED VIRTUAL MEMORY SYSTEM

CROSS-REFERENCE TO RELATED APPLICATIONS

This application claims the priority benefit of the U.S. provisional patent application Ser. No. 61/782,349, filed Mar. 14, 2013 and titled "Unified Virtual Memory." This application also claims the priority benefit of the U.S. provisional patent application Ser. No. 61/800,004, filed Mar. 15, 2013 and titled "CPU-To-GPU and GPU-To-GPU Atomics." The subject matter of these related applications is hereby incorporated herein by reference.

BACKGROUND OF THE INVENTION

1. Field of the Invention

Embodiments of the present invention relate generally to virtual memory, and, more specifically, to a fault buffer for tracking page faults in a unified virtual memory system.

2. Description of the Related Art

Most modern computer systems typically implement some type of virtual memory architecture. Among other things, the virtual memory architecture enables instructions to access memory using virtual memory addresses, rather than physical memory addresses. By providing this virtual memory layer between physical memory and application software, user-level software is shielded from the details of physical memory management, which is left to a dedicated memory management system.

A typical computer system that implements a virtual memory architecture includes a central processing unit (CPU) and one or more parallel processing units (GPUs). In operation, a software process executing on either a CPU or a GPU may request data via a virtual memory address. In many traditional architectures, the virtual memory systems that handle requests for data via virtual memory addresses for a CPU and a GPU are independent. More specifically, a separate CPU memory management system and a separate GPU memory management system handle requests for data from the CPU and GPU, respectively.

There are several drawbacks associated with such independent memory management systems. For example, each independent memory management system does not necessarily have knowledge of the contents of the memory units associated with the other memory management system. Thus, the memory management systems cannot necessarily cooperate to provide certain efficiencies, such as determining where data should be stored for improved access latency. Additionally, as the memory management systems are independent, pointers for one such system are not necessarily compatible with the other system. Thus, an application programmer must keep track of two different types of pointers.

As the foregoing illustrates, what is needed in the art is a more efficient approach to managing virtual memory in a system with heterogeneous processors, such as a CPU and a GPU.

One embodiment of the present invention sets forth a system for tracking page faults. The system includes a first processing entity. The first processing entity is configured to execute a first instruction that is associated with a first virtual memory address, determine that a first page table associated with the first processing entity does not include a first mapping associated with the first virtual memory address, and transmit a first fault buffer entry to a fault buffer in response to determining that that first page table does not include the first mapping. The fault buffer is configured to store a plurality of fault buffer entries received from at least the first processing entity.

One advantage of the disclosed approach is that user-level applications do not need to keep track of multiple pointers depending on where a particular piece of data is stored. An additional advantage is that memory pages are migrated between memory units based on usage, which allows memory pages to be located local to units that access the memory pages more frequently. Another advantage is that a fault buffer is provided that allows faults generated by the PPU to be coalesced for efficient execution.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
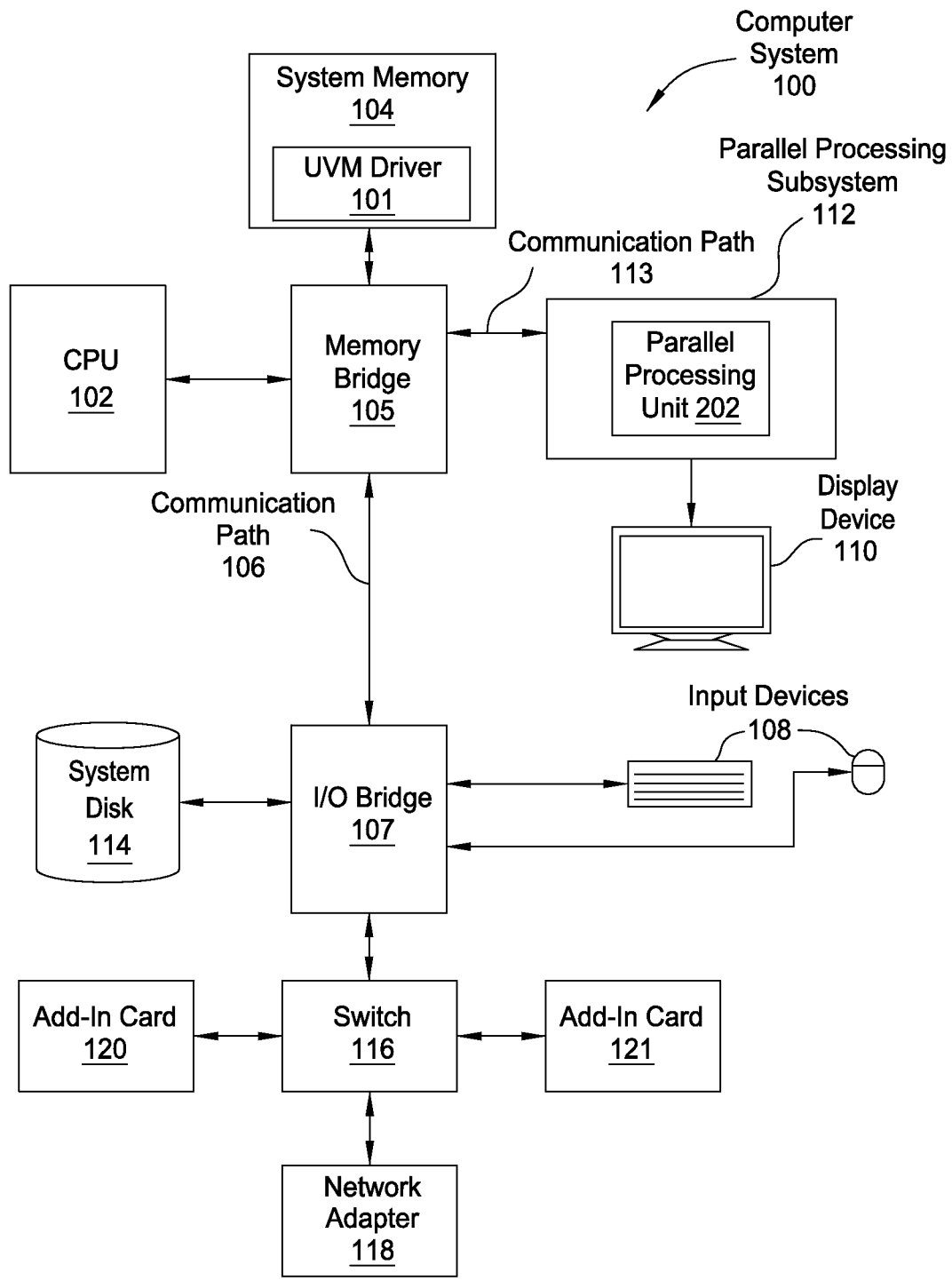
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes one or more parallel processing units (PPUs) 202. In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC). As is well-known, many graphics processing units (GPUs) are designed to perform parallel operations and computations and, thus, are considered to be a class of parallel processing unit (PPU).

Any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

PPU 202 advantageously implements a highly parallel processing architecture. PPU 202 includes a number of general processing clusters (GPCs). Each GPC is capable of executing a large number (e.g., hundreds or thousands) of threads concurrently, where each thread is an instance of a program. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads. Unlike a SIMD execution regime, where all processing engines typically execute identical instructions, SIMT execution allows different threads to more readily follow divergent execution paths through a given thread program.

GPCs include a number of streaming multiprocessors (SMs), where each SM is configured to process one or more thread groups. The series of instructions transmitted to a particular GPC constitutes a thread, as previously defined herein, and the collection of a certain number of concurrently executing threads across the parallel processing engines within an SM is referred to herein as a "warp" or "thread group." As used herein, a "thread group" refers to a group of threads concurrently executing the same program on different input data, with one thread of the group being assigned to a different processing engine within an SM. Additionally, a plurality of related thread groups may be active (in different phases of execution) at the same time within an SM. This collection of thread groups is referred to herein as a "cooperative thread array" ("CTA") or "thread array."

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

In operation, CPU 102 is the master processor of computer system 100, controlling and coordinating operations of other system components. In particular, CPU 102 issues commands that control the operation of PPUs 202. In one embodiment, communication path 113 is a PCI Express link, in which dedicated lanes are allocated to each PPU 202, as is known in the art. Other communication paths may also be used. PPU 202 advantageously implements a highly parallel processing architecture. A PPU 202 may be provided with any amount of local parallel processing memory (PPU memory).

In some embodiments, system memory 104 includes a unified virtual memory (UVM) driver 101. The UVM driver 101 includes instructions for performing various tasks related to management of a unified virtual memory (UVM) system common to both the CPU 102 and the PPUs 202. Among other things, the architecture enables the CPU 102 and the PPU 202 to access a physical memory location using a common virtual memory address, regardless of whether the physical memory location is within the system memory 104 or memory local to the PPU 202.

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Unified Virtual Memory System Architecture

Figure 2:
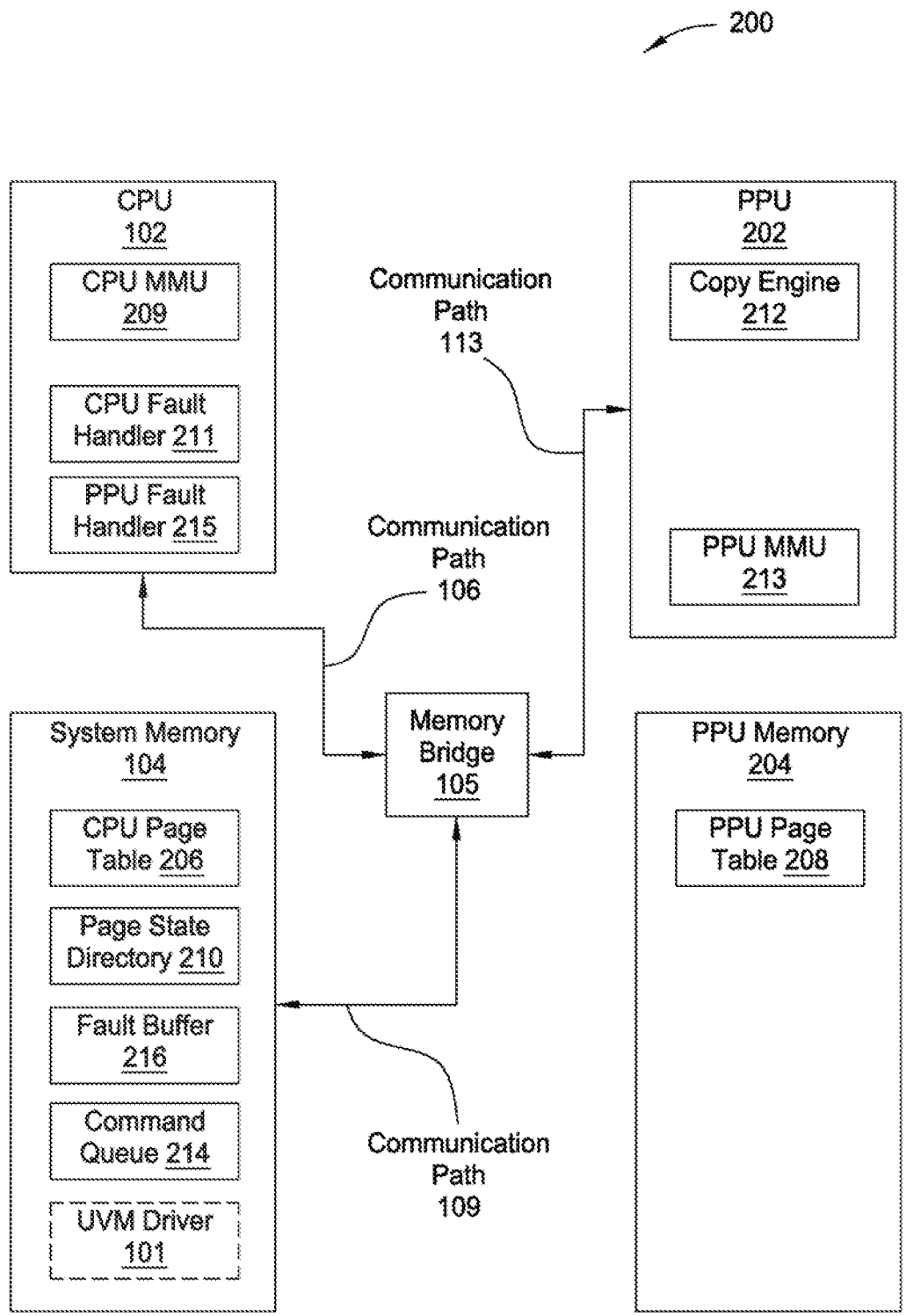
FIG. 2 is a block diagram illustrating a unified virtual memory system, according to one embodiment of the present invention.

FIG. 2 is a block diagram illustrating a unified virtual memory (UVM) system 200, according to one embodiment of the present invention. As shown, the unified virtual memory system 200 includes, without limitation, the CPU 102, the system memory 104, and the parallel processing unit (PPU) 202 coupled to a parallel processing unit memory (PPU memory) 204. The CPU 102 and the system memory 104 are coupled to each other and to the PPU 202 via the memory bridge 105.

The CPU 102 executes threads that may request data stored in the system memory 104 or the PPU memory 204 via a virtual memory address. Virtual memory addresses shield threads executing in the CPU 102 from knowledge about the internal workings of a memory system. Thus, a thread may only have knowledge of virtual memory addresses, and may access data by requesting data via a virtual memory address.

The CPU 102 includes a CPU MMU 209, which processes requests from the CPU 102 for translating virtual memory addresses to physical memory addresses. The physical memory addresses are required to access data stored in a physical memory unit such as the system memory 104 and the PPU memory 204. The CPU 102 includes a CPU fault handler 211, which executes steps in response to the CPU MMU 209 generating a page fault, to make requested data available to the CPU 102. The CPU fault handler 211 is generally software that resides in the system memory 104 and executes on the CPU 102, the software being provoked by an interrupt to the CPU 102.

The system memory 104 stores various memory pages (not shown) that include data for use by threads executing on the CPU 102 or the PPU 202. As shown, the system memory 104 stores a CPU page table 206, which includes mappings between virtual memory addresses and physical memory addresses. The system memory 104 also stores a page state directory 210, which acts as a "master page table" for the UVM system 200, as is discussed in greater detail below. The system memory 104 stores a fault buffer 216, which includes entries written by the PPU 202 in order to inform the CPU 102 of a page fault generated by the PPU 202. In some embodiments, the system memory 104 includes the unified virtual memory (UVM) driver 101, which includes instructions that, when executed, cause the CPU 102 to execute commands for, among other things, remedying a page fault. In alternative embodiments, any combination of the page state directory 210, the fault buffer 216, and one or more command queues 214 may be stored in the PPU memory 204. Further, a PPU page table 208 may be stored in the system memory 104.

In a similar manner as with the CPU 102, the PPU 202 executes instructions that may request data stored in the system memory 104 or the PPU memory 204, via a virtual memory address. The PPU 202 includes a PPU MMU 213, which processes requests from the PPU 202 for translating virtual memory addresses to physical memory addresses. The PPU 202 includes a copy engine 212, which executes commands stored in the command queue 214 for copying memory pages, modifying data in the PPU page table 208, and other commands. A PPU fault handler 215 executes steps in response to a page fault on the PPU 202. The PPU fault handler 215 can be software running a processor or dedicated microcontroller in the PPU 202, or the PPU fault handler 215 can be software running on the CPU 102, with the latter being the preferred choice. In some embodiments, the CPU fault handler 211 and the PPU fault handler 215 can be a unified software program that is invoked by a fault on either the CPU 102 or the PPU 202. The command queue 214 may be in either the PPU memory 204 or the system memory 104, but is preferentially located in the system memory 104.

In some embodiments, the CPU fault handler 211 and the UVM driver 101 may be a unified software program. In such cases, the unified software program may be software that resides in the system memory 104 and executes on the CPU 102. The PPU fault handler 215 may be a separate software program running on a processor or dedicated microcontroller in the PPU 202, or the PPU fault handler 215 may be a separate software program running on the CPU 102.

In other embodiments, the PPU fault handler 215 and the UVM driver 101 may be a unified software program. In such cases, the unified software program may be software that resides in the system memory 104 and executes on the CPU 102. The CPU fault handler 211 may be a separate software program that resides in the system memory 104 and executes on the CPU 102.

In other embodiments, the CPU fault handler 211, the PPU fault handler 215, and the UVM driver 101 may be a unified software program. In such cases, the unified software program may be software that resides in the system memory 104 and executes on the CPU 102.

In some embodiments, the CPU fault handler 211, the PPU fault handler 215, and the UVM driver 101 may all reside in system memory 104, as described above. As shown in FIG. 2, the UVM driver 101 resides in system memory 104, while the CPU fault handler 211 and the PPU fault handler 215 reside in the CPU 102.

The CPU fault handler 211 and the PPU fault handler 215 are responsive to hardware interrupts that may emanate from the CPU 102 or the PPU 202, such as interrupts resulting from a page fault. As further described below, the UVM driver 101 includes instructions for performing various tasks related to management of the UVM system 200, including, without limitation, remedying a page fault, and accessing the CPU page table 206, the page state directory 210, the command queue 214, and/or the fault buffer 216.

In some embodiments, the CPU page table 206 and the PPU page table 208 have different formats, and contain different information; for example, the PPU page table 208 may contain the following while the CPU page table 206 does not: atomic disable bit; compression tags; and memory swizzling type.

In a similar manner as with the system memory 104, the PPU memory 204 stores various memory pages (not shown). As shown, the PPU memory 204 also includes the PPU page table 208, which includes mappings between virtual memory addresses and physical memory addresses. Alternatively, the PPU page table 208 may be stored in the system memory 104.

Page State Directory

Figure 3:
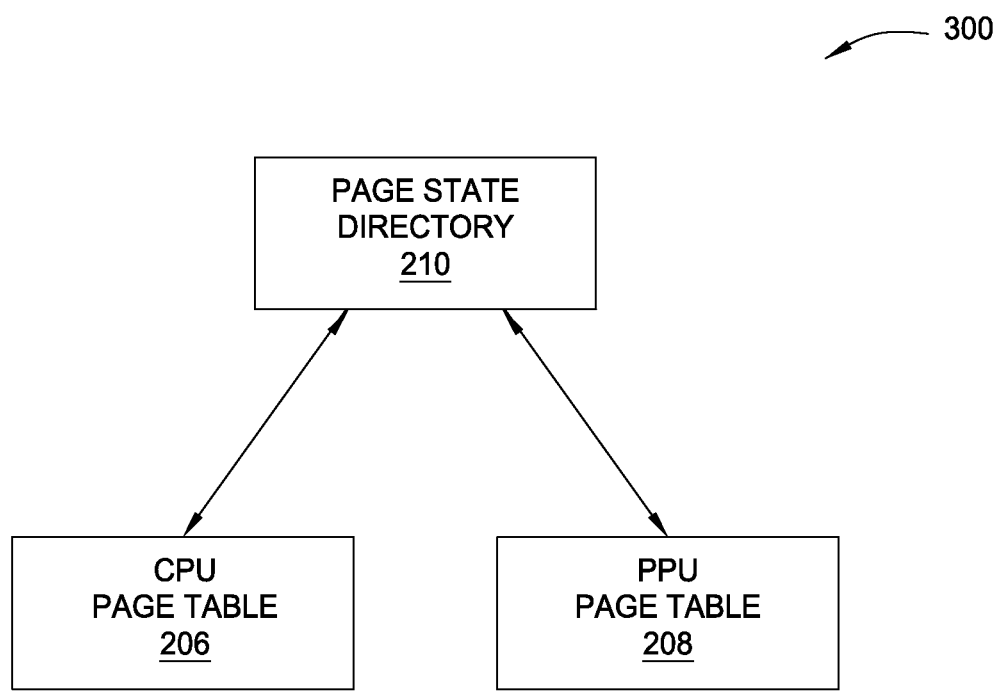
FIG. 3 is a conceptual illustration of a system 300 for tracking the state of memory pages, according to one embodiment of the present invention.

FIG. 3 is a conceptual illustration of a system 300 for tracking the state of memory pages, according to one embodiment of the present invention. As shown, the system 300 includes a page state directory 210 coupled to both a CPU page table 206 and a PPU page table 208.

The page state directory 210 is a data structure that stores mappings associated with each memory page in a particular virtual memory address space. To obtain a physical address from PSD 210, a requestor provides a requested virtual address to the PSD 210, which performs a lookup operation based on the virtual address. In some embodiments, the PSD 210 is able to keep track of memory pages of different sizes. To do so, the PSD 210 includes multiple arrays. For example, a first array manages CPU-sized pages, and a second array manages PPU-sized pages.

Although the page state directory 210 may be implemented in any technically feasible manner, in one embodiment, the page state directory 210 includes a multi-level table. Each non-leaf level includes an array of pointers to entries in the next level. Pointers may point to entries in either PPU memory 204 or system memory 104.

Either the CPU 102 or PPU 202 may update the PSD 210. Updates to a PSD 210 page in system memory 104 may be accomplished by using atomic compare-and-swap across the PCI-E bus. Updates to PSD 210 pages in PPU memory 204 are accomplished by placing an update request into a PSD update circular buffer that is stored in system memory. An agent checks the circular buffer to apply updates before any read operation on the PSD 210.

As described below, multiple virtual memory address spaces may exist. Two different processes running on CPU 102 may be assigned two different virtual memory address spaces. Some processes may share address spaces. A PSD 210 exists for each virtual memory address space.

Different PSDs 210 may each include a mapping to the same memory location in system memory 104 or PPU memory 204. In such a case, a single process may be designated as the owner of the memory location. The PSD 210 corresponding to that single process is deemed the "owner PSD." The owner PSD includes a mapping to the memory location, and the PSDs 210 for all other processes that include mappings to that memory location include a link to the mapping in the owner PSD.

When a process associated with a particular PSD 210 no longer requires a particular mapping associated with a particular memory location, the process causes the mapping to be removed from the PSD 210 associated with that process. The mapping is placed onto a retired list. At this point, other PSDs 210 may still include mappings to the memory location. Those PSDs 210 continue to include that mapping until the processes associated with those PSDs 210 determine that the mapping is no longer needed. When no PSDs 210 include mappings associated with the memory location, then the mapping is removed from the retired list.

Entries in the PSD 210 include a mapping between a virtual memory address and a physical memory address. The entries also include state information for the memory page that is associated with the entry. The following list includes several example states that may be included in PSD entries in various embodiments of the invention. "Exclusive"—a memory page may be deemed "exclusive," meaning that the memory page is not duplicated and is visible to either a PPU 202 or a CPU 102, but not both. The "exclusive" state is similar to the "PPU-owned" or "CPU-owned" state, discussed below. "Shared-uncached"—a memory page may be deemed "shared-uncached," meaning that the memory page is not duplicated, but is visible to one or more PPUs 202 and/or one or more CPUs 102. The "shared-uncached" state is similar to the "CPU-shared" state discussed below, with the additional quality of being "uncached," meaning "not duplicated." A memory page may be resident in more than one memory unit (e.g., in both system memory 104 and PPU memory 204), and thus "duplicated." "Read-duplicated"—a memory page may be deemed "read-duplicated," meaning that more than one copy of the memory page exists, and that at least one of the copies is local to either a CPU 102 or a PPU 202 and is available for only reading to that CPU 102 or PPU 202. "Migrating-read-only"—a memory page may be deemed "migrating-read-only," meaning that the memory page is in the process of being migrated. For example, the UVM system 200 may be in the process of migrating the memory page from PPU memory 204 to system memory 104. Because the memory page is deemed "migrating-read-only," the memory page may be read from but not written to while in this state. "Migrating-invisible"—a memory page may be deemed "migrating-invisible," meaning that the memory page is in the process of being migrated, but the memory page is "invisible," meaning that no process can read or write to the memory page. "Peer-forwarding-entry"—a particular entry in a PSD 210 may be deemed a "peer-forwarding entry," meaning that the entry contains a link to a different entry in the PSD 210 that includes a mapping associated with the memory page.

The UVM system 200 may store memory pages in a backing store, such as hard drive disk space. The UVM driver 101 or operating system keeps track of memory pages that are stored in the backing store. If a lookup operation performed on a PSD 210 indicates that a memory page is stored in the backing store, then the UVM driver 101 moves the memory page from the backing store to either system memory 104 or PPU memory 204. After the memory page is copied from the backing store, the UVM driver 101 retries the PSD 210 lookup.

The following table depicts example PSD entries. Each row depicts a different example entry.

| State | Data | |
| --- | --- | --- |
| Page Has Peers | Forwarding Address | |
| Invalid Entry | None | |
| Migrating (Read Only) | None | |
| Migrating (Invisible) | None | |
| Exclusive Entry | Allowed Access | Physical Address |
| Shared-Uncached Entry | Physical Address | Allowed Access |
| Read Duplicated Entry | Bloom Filter for Which Processor has this Page | Physical Address |

Translating Virtual Memory Addresses

Referring back to FIG. 2, when a thread executing in the CPU 102 requests data via a virtual memory address, the CPU 102 requests translation of the virtual memory address to a physical memory address, from the CPU memory management unit (CPU MMU) 209. In response, the CPU MMU 209 attempts to translate the virtual memory address into a physical memory address, which specifies a location in a memory unit, such as the system memory 104, that stores the data requested by the CPU 102.

To translate a virtual memory address to a physical memory address, the CPU MMU 209 performs a lookup operation to determine if the CPU page table 206 includes a mapping associated with the virtual memory address. In addition to a virtual memory address, a request to access data may also indicate a virtual memory address space. The unified virtual memory system 200 may implement multiple virtual memory address spaces, each of which is assigned to one or more threads. Virtual memory addresses are unique within any given virtual memory address space. Further, virtual memory addresses within a given virtual memory address space are consistent across the CPU 102 and the PPU 202, thereby allowing the same virtual address to refer to the same data across the CPU 102 and the PPU 202. In some embodiments, two virtual memory addresses in the same virtual address space may refer to the same data, but generally may not map to the same physical memory address (e.g., the CPU 102 and the PPU 202 may each have a local read-only copy of the data.)

For any given virtual memory address, the CPU page table 206 may or may not include a mapping between the virtual memory address and a physical memory address. If the CPU page table 206 includes a mapping, then the CPU MMU 209 reads that mapping to determine a physical memory address associated with the virtual memory address and provides that physical memory address to the CPU 102. However, if the CPU page table 206 does not include a mapping associated with the virtual memory address, then the CPU MMU 209 is unable to translate the virtual memory address into a physical memory address, and the CPU MMU 209 generates a page fault. To remedy a page fault and make the requested data available to the CPU 102, a "page fault sequence" is executed. More specifically, the CPU 102 reads the PSD 210 to find the current mapping state of the page and then determines the appropriate page fault sequence. The page fault sequence generally maps the memory page associated with the requested virtual memory address or changes the types of accesses permitted (e.g., read access, write access, atomic access), unless a fatal fault has occurred. The different types of page fault sequences implemented in the UVM system 200 are discussed in greater detail below.

Within the UVM system 200, data associated with a given virtual memory address may be stored in the system memory 104, in the PPU memory 204, or in both the system memory 104 and the PPU memory 204 as read-only copies of the same data. Further, for any such data, either or both of the CPU page table 206 or the PPU page table 208 may include a mapping associated with that data. Notably, some data exists for which a mapping exists in one page table, but not in the other. However, the PSD 210 includes all mappings stored in the PPU page table 208, and the PPU-relevant mappings stored in the CPU page table 206. The PSD 210 thus functions as a "master" page table for the unified virtual memory system 200. Therefore, when the CPU MMU 209 does not find a mapping in the CPU page table 206 associated with a particular virtual memory address, the CPU 102 reads the PSD 210 to determine whether the PSD 210 includes a mapping associated with that virtual memory address. Various embodiments of the PSD 210 may include different types of information associated with virtual memory addresses in addition to mappings associated with the virtual memory address.

When the CPU MMU 209 generates a page fault, the CPU fault handler 211 executes a sequence of operations for the appropriate page fault sequence to remedy the page fault. Again, during a page fault sequence, the CPU 102 reads the PSD 210 and executes additional operations in order to change the mappings or permissions within the CPU page table 206 and the PPU page table 208. Such operations may include reading and/or modifying the CPU page table 206, reading and/or modifying page state directory 210 entries, and/or migrating blocks of data referred to as "memory pages" between memory units (e.g., the system memory 104 and the PPU memory 204).

Figure 4:
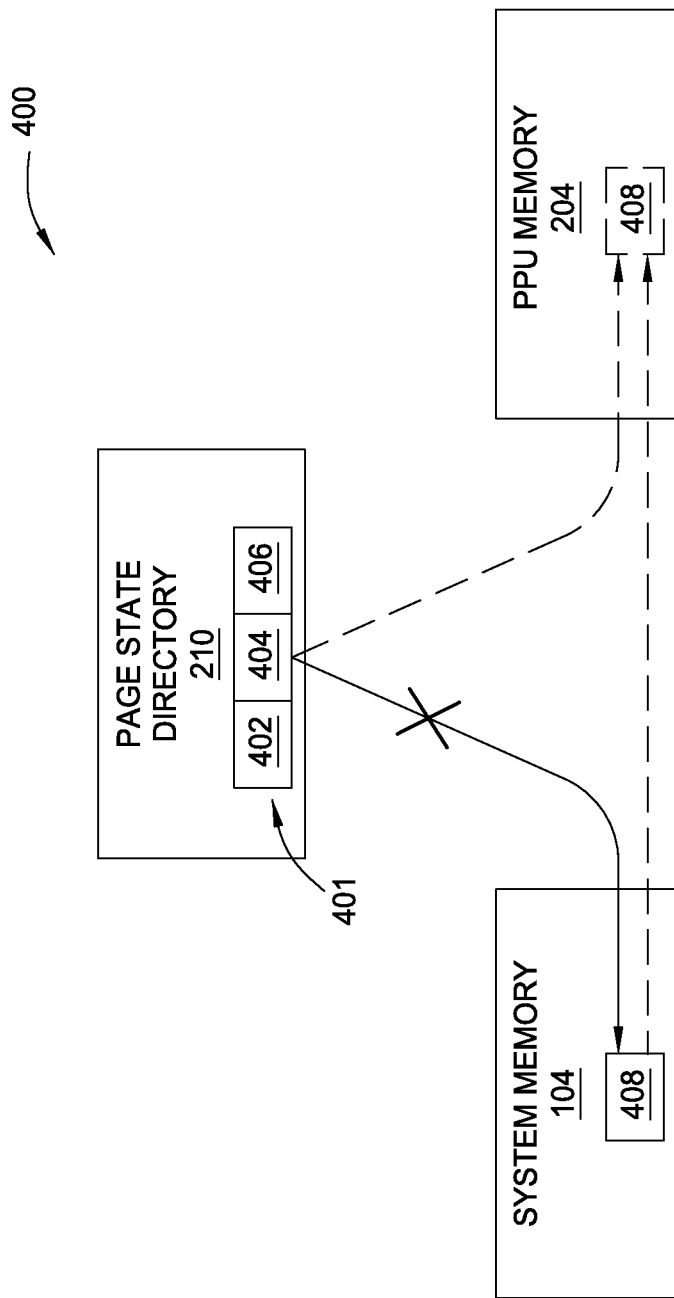
FIG. 4 is a conceptual illustration of a system implementing a migration operation, according to one embodiment of the present invention.

FIG. 4 is a conceptual illustration of a system 400 implementing a migration operation, according to one embodiment of the present invention. As shown, the system 400 includes a page state directory 210, system memory 104, and PPU memory 204.

As explained above, the page state directory 210 stores PSD entries 401 that indicate all or part of a virtual memory address 402, all or part of a physical memory address 404, and state information 406. The PSD entries 401 thus map virtual memory addresses 402 to physical memory address 404.

In response to a page fault, the UVM driver 101 may determine that a memory page, such as memory page 408, is to be migrated from one memory unit to another memory unit in order to resolve the page fault. For example, the UVM driver 101 may determine that memory page 408 is to be migrated from system memory 104 to PPU memory 204. In response to this determination, the UVM driver 101 executes a series of operations, referred to as a page fault sequence below, to cause the memory page 408 to be migrated. In addition, the page fault sequence may change part of a page state directory entry 401 associated with memory page 408. More specifically, the page fault sequence may update the physical memory address 404 to the physical location of the memory page 408 after the memory page has been migrated. However, the virtual memory address 402 in the page state directory entry 401 remains unchanged, which allows pointers in application programs remain constant and to refer to memory pages 408 no matter where the memory pages 408 are stored.

To determine which operations to execute in a page fault sequence, the CPU 102 identifies the memory page associated with the virtual memory address. The CPU 102 then reads state information for the memory page from the PSD 210 related to the virtual memory address associated with the memory access request that caused the page fault. Such state information may include, among other things, an ownership state for the memory page associated with the virtual memory address. For any given memory page, several ownership states are possible. For example, a memory page may be "CPU-owned," "PPU-owned," or "CPU-shared." A memory page is considered CPU-owned if the CPU 102 can access the memory page via a virtual address, and if the PPU 202 cannot access the memory page via a virtual address without causing a page fault. Preferably, a CPU-owned page resides in the system memory 104, but can reside in the PPU memory 204. A memory page is considered PPU-owned if the PPU 202 can access the page via a virtual address, and if the CPU 102 cannot access the memory page via a virtual address without causing a page fault. Preferably, a PPU-owned page resides in the PPU memory 204, but can reside in the system memory 104 when migration from the system memory 104 to the PPU memory 204 is not done, generally due to the short-term nature of the PPU ownership. A memory page is considered CPU-shared if the memory page is stored in the system memory 104 and a mapping to the memory page exists in the PPU page table 208 that allows the PPU 202 to access the memory page in the system memory 104 via a virtual memory address.

The UVM system 200 may assign ownership states to memory pages based on a variety of factors, including the usage history of the memory page, the usage history optionally stored in PSD 210 entries. Usage history may include information regarding whether the CPU 102 or the PPU 202 accessed the memory page recently, and how many times such accesses were made. For example, the UVM system 200 may assign an ownership state of "CPU-owned" for a given memory page and locate the page in system memory 104 if, based on the usage history of the memory page, the UVM system 200 determines that the memory page is likely to be used mostly or only by the CPU 102. Similarly, the UVM system 200 may assign an ownership of "PPU-owned" for a given memory page and locate the page in PPU memory 204 if, based on the usage history of the memory page, the UVM system 200 determines that the memory page is likely to be used mostly or only by the PPU 202. Finally, the UVM system 200 may assign an ownership of "CPU-shared" for a given memory page if, based on the usage history of the memory page, the UVM system 200 determines that the memory page is likely to be used both by the CPU 102 and by the PPU 202, and that migrating the memory page back and forth from the system memory 104 to the PPU memory 204 would consume too much time.

As examples, the fault handlers 211 and 215 can implement any or all of the following heuristics for migrating:

(a) on the CPU 102 access to an unmapped page that is mapped to the PPU 202, that has not been recently migrated, unmap the faulting page from the PPU 202, migrate the page to the CPU 102, and map the page to the CPU 102;

(b) on the PPU 202 access to an unmapped page that is mapped to the CPU 102, that has not been recently migrated, unmap the faulting page from the CPU 102, migrate the page to the PPU 202, and map the page to the PPU 202;

(c) on the CPU 102 access to an unmapped page that is mapped to the PPU 202, that has been recently migrated, migrate the faulting page to the CPU 102 and map the page on both the CPU 102 and the PPU 202;

(d) on the PPU 202 access to an unmapped page that is mapped on the CPU 102, that has been recently migrated, map the page to both the CPU 102 and the PPU 202;

(e) on the PPU 102 atomic access to page that is mapped to both the CPU 102 and the PPU 202 but not enabled for atomic operations by the PPU 202, unmap the page from the CPU 102, and map to the PPU 202 with atomic operations enabled;

(f) on the PPU 202 write access to page that is mapped on the CPU 102 and PPU 202 as copy-on-write (COW), copy the page to the PPU 202, thereby making independent copies of the page, mapping the new page as read-write on the PPU, and leaving the current page as mapped on the CPU 102;

(g) on the PPU 202 read access to page that is mapped on the CPU 102 and PPU 202 as zero-fill-on-demand (ZFOD), allocate a page of physical memory on the PPU 202 and fill it with zeros, and map that page on the PPU, but change it to unmapped on the CPU 102.

(h) on an access by a first PPU 202(1) to an unmapped page that is mapped on a second PPU 202(2), that has not been recently migrated, unmap the faulting page from the second PPU 202(2), migrate the page to the first PPU 202(1), and map the page to the first PPU 202(1); and (i) on an access by a first PPU 202(1) to an unmapped page that is mapped on a second PPU 202(2), that has been recently migrated, map the faulting page to the first PPU 202(1), and keep the mapping of the page on the second PPU 202(2).

In sum, many heuristic rules are possible, and the scope of the present invention is not limited to these examples.

In addition, any migration heuristic can "round up" to include more pages or a larger page size, for example:

(j) on the CPU 102 access to an unmapped page that is mapped to the PPU 202, that has not been recently migrated, unmap the faulting page, plus additional pages that are adjacent to the faulting page in the virtual address space, from the PPU 202, migrate the pages to the CPU 102, and map the pages to the CPU 102 (in more detailed example: for a 4 kB faulted page, migrate the aligned 64 kB region that includes the 4 kB faulted page);

(k) on the PPU 202 access to an unmapped page that is mapped to the CPU 102, that has not been recently migrated, unmap the faulting page, plus additional pages that are adjacent to the faulting page in the virtual address space, from the CPU 102, migrate the pages to the PPU 202, and map the pages to the PPU 202 (in more detailed example: for a 4 kB faulted page, migrate the aligned 64 kB region that includes the 4 kB faulted page);

(l) on the CPU 102 access to an unmapped page that is mapped to the PPU 202, that has not been recently migrated, unmap the faulting page, plus additional pages that are adjacent to the faulting page in the virtual address space, from the PPU 202, migrate the pages to the CPU 102, map the pages to the CPU 102, and treat all the migrated pages as one or more larger pages on the CPU 102 (in more detailed example: for a 4 kB faulted page, migrate the aligned 64 kB region that includes the 4 kB faulted page, and treat the aligned 64 kB region as a 64 kB page);

(m) on the PPU 202 access to an unmapped page that is mapped on the CPU 102, that has not been recently migrated, unmap the faulting page, plus additional pages that are adjacent to the faulting page in the virtual address space, from the CPU 102, migrate the pages to the PPU 202, map the pages to the PPU 202, and treat all the migrated pages as one or more larger pages on the PPU 202 (in more detailed example: for a 4 kB faulted page, migrate the aligned 64 kB region that includes the 4 kB faulted page, and treat the aligned 64 kB region as a 64 kB page);

(n) on the access by a first PPU 202(1) to an unmapped page that is mapped to a second PPU 202(2), that has not been recently migrated, unmap the faulting page, plus additional pages that are adjacent to the faulting page in the virtual address space, from the second PPU 202(2), migrate the pages to the first PPU 202(1), and map the pages to the first PPU 202(1); and (o) on an access by a first PPU 202(1) to an unmapped page that is mapped to a second PPU 202(2), that has been recently migrated, map the faulting page, plus additional pages that are adjacent to the faulting page in the virtual address space, to the first PPU 202(1), and keep the mapping of the page on the second PPU 202(2).

In sum, many heuristic rules that include "rounding up" are possible, and scope of the present invention is not limited to these examples.

In some embodiments, the PSD entries may include transitional state information to ensure proper synchronization between various requests made by units within the CPU 102 and the PPU 202. For example, a PSD 210 entry may include a transitional state indicating that a particular page is in the process of being transitioned from CPU-owned to PPU-owned. Various units in the CPU 102 and the PPU 202, such as the CPU fault handler 211 and the PPU fault handler 215, upon determining that a page is in such a transitional state, may forego portions of a page fault sequence to avoid steps in a page fault sequence triggered by a prior virtual memory access to the same virtual memory address. As a specific example, if a page fault results in a page being migrated from the system memory 104 to the PPU memory 204, a different page fault that would cause the same migration is detected and does not cause another page migration. Further, where there is more than one writer to the PSD 210, various units in the CPU 102 and the PPU 202 may implement atomic operations for proper ordering of operations on the PSD 210. For example, for modifications to PSD 210 entries, the CPU fault handler 211 or the PPU fault handler 215 may issue an atomic compare and swap operation to modify the page state of a particular entry in the PSD 210. Consequently, the modification is done without interference by operations from other units.

Multiple PSDs 210 may be stored in the system memory 104—one for each virtual memory address space. A memory access request generated by either the CPU 102 or the PPU 202 may therefore include a virtual memory address and also identify the virtual memory address space associated with that virtual memory address. Additional details regarding page state directories are provided below with respect to FIG. 3.

Just as the CPU 102 may execute memory access requests that include virtual memory addresses (i.e., instructions that include requests to access data via a virtual memory address), the PPU 202 may also execute similar types of memory access requests. More specifically, the PPU 202 includes a plurality of execution units, such as GPCs and SMs, described above in conjunction with FIG. 1, that are configured to execute multiple threads and thread groups. In operation, those threads may request data from memory (e.g., the system memory 104 or the PPU memory 204) by specifying a virtual memory address. Just as with the CPU 102 and the CPU MMU 209, the PPU 202 includes the PPU memory management unit (MMU) 213. The PPU MMU 213 receives requests for translation of virtual memory addresses from the PPU 202, and attempts to provide a translation from the PPU page table 208 for the virtual memory addresses. Similar to the CPU page table 206, the PPU page table 208 includes mappings between virtual memory addresses and physical memory addresses. As is also the case with the CPU page table 206, for any given virtual address, the PPU page table 208 may not include a page table entry that maps the virtual memory address to a physical memory address. As with the CPU MMU 209, when the PPU MMU 213 requests a translation for a virtual memory address from the PPU page table 208 and either no mapping exists in the PPU page table 208 or the type of access is not allowed by the PPU page table 208, the PPU MMU 213 generates a page fault. Subsequently, the PPU fault handler 215 triggers a page fault sequence. Again, the different types of page fault sequences implemented in the UVM system 200 are described in greater detail below.

As stated above, in response to receiving a request for translation of a virtual memory address, the CPU MMU 209 generates a page fault if the CPU page table 206 does not include a mapping associated with the requested virtual memory address or does not permit the type of access being requested. Similarly, in response to receiving a request for translation of a virtual memory address, the PPU MMU 213 generates a page fault if the PPU page table 208 does not include a mapping associated with the requested virtual memory address or does not permit the type of access being requested. When the CPU MMU 209 or the PPU MMU 213 generates a page fault, the thread that requested the data at the virtual memory address stalls, and a "local fault handler"—the CPU fault handler 211 for the CPU 102 or the PPU fault handler 215 for the PPU 202—attempts to remedy the page fault by executing a "page fault sequence." As indicated above, a page fault sequence includes a series of operations that enable the faulting unit (i.e., the unit—either the CPU 102 or the PPU 202—that caused the page fault) to access the data associated with the virtual memory address. After the page fault sequence completes, the thread that requested the data via the virtual memory address resumes execution. In some embodiments, fault recovery is simplified by allowing the fault recovery logic to track faulting memory accesses as opposed to faulting instructions.

The operations executed during a page fault sequence depend on the change in ownership state or change in access permissions, if any, that the memory page associated with the page fault has to undergo. The transition from a current ownership state to a new ownership state, or a change in access permissions, may be part of the page fault sequence. In some instances, migrating the memory page associated with the page fault from the system memory 104 to the PPU memory 204 is also part of the page fault sequence. In other instances, migrating the memory page associated with the page fault from the PPU memory 204 to the system memory 104 is also part of the page fault sequence. Various heuristics, more fully described herein, may be used to configure UVM system 200 to change memory page ownership state or to migrate memory pages under various sets of operating conditions and patterns. Described in greater detail below are page fault sequences for the following four memory page ownership state transitions: CPU-owned to CPU-shared, CPU-owned to PPU-owned, PPU-owned to CPU-owned, and PPU-owned to CPU-shared.

A fault by the PPU 202 may initiate a transition from CPU-owned to CPU-shared. Prior to such a transition, a thread executing in the PPU 202 attempts to access data at a virtual memory address that is not mapped in the PPU page table 208. This access attempt causes a PPU-based page fault, which then causes a fault buffer entry to be written to the fault buffer 216. In response, the PPU fault handler 215 reads the PSD 210 entry corresponding to the virtual memory address and identifies the memory page associated with the virtual memory address. After reading the PSD 210, the PPU fault handler 215 determines that the current ownership state for the memory page associated with the virtual memory address is CPU-owned. Based on the current ownership state as well as other factors, such as usage characteristics for the memory page or the type of memory access, the PPU fault handler 215 determines that a new ownership state for the page should be CPU-shared.

To change the ownership state, the PPU fault handler 215 writes a new entry in the PPU page table 208 corresponding to the virtual memory address and associating the virtual memory address with the memory page identified via the PSD 210 entry. The PPU fault handler 215 also modifies the PSD 210 entry for that memory page to indicate that the ownership state is CPU-shared. In some embodiments, an entry in a translation look-aside buffer (TLBs) in the PPU 202 is invalidated to account for the case where the translation to an invalid page is cached. At this point, the page fault sequence is complete. The ownership state for the memory page is CPU-shared, meaning that the memory page is accessible to both the CPU 102 and the PPU 202. Both the CPU page table 206 and the PPU page table 208 include entries that associate the virtual memory address to the memory page.

A fault by the PPU 202 may initiate a transition from CPU-owned to PPU-owned. Prior to such a transition, an operation executing in the PPU 202 attempts to access memory at a virtual memory address that is not mapped in the PPU page table 208. This memory access attempt causes a PPU-based page fault, which then causes a fault buffer entry to be written to the fault buffer 216. In response, the PPU fault handler 215 reads the PSD 210 entry corresponding to the virtual memory address and identifies the memory page associated with the virtual memory address. After reading the PSD 210, the PPU fault handler 215 determines that the current ownership state for the memory page associated with the virtual memory address is CPU-owned. Based on the current ownership state, as well as other factors, such as usage characteristics for the page or the type of memory access, the PPU fault handler 215 determines that a new ownership state for the page is PPU-owned.

The PPU 202 writes a fault buffer entry into fault buffer 216 that indicates that the PPU 202 generated a page fault, and indicates the virtual memory address associated with the page fault. The PPU fault hander 215 executing on the CPU 102 reads the fault buffer entry and, in response, the CPU 102 removes the mapping in the CPU page table 206 associated with the virtual memory address that caused the page fault. The CPU 102 may flush caches before and/or after the mapping is removed. The CPU 102 also writes commands into the command queue 214 instructing the PPU 202 to copy the page from the system memory 104 into the PPU memory 204. The copy engine 212 in the PPU 202 reads the commands in the command queue 214 and copies the page from the system memory 104 to the PPU memory 204. The PPU 202 writes a page table entry into the PPU page table 208 corresponding to the virtual memory address and associating the virtual memory address with the newly-copied memory page in the PPU memory 204. The writing to the PPU page table 208 may be done via the copy engine 212. Alternatively, the CPU 102 can update the PPU page table 208. The PPU fault handler 215 also modifies the PSD 210 entry for that memory page to indicate that the ownership state is PPU-owned. In some embodiments, entries in TLBs in the PPU 202 or the CPU 102 may be invalidated, to account for the case where the translation was cached. At this point, the page fault sequence is complete. The ownership state for the memory page is PPU-owned, meaning that the memory page is accessible only to the PPU 202. Only the PPU page table 208 includes an entry that associates the virtual memory address with the memory page.

A fault by the CPU 102 may initiate a transition from PPU-owned to CPU-owned. Prior to such a transition, an operation executing in the CPU 102 attempts to access memory at a virtual memory address that is not mapped in the CPU page table 206, which causes a CPU-based page fault. The CPU fault handler 211 reads the PSD 210 entry corresponding to the virtual memory address and identifies the memory page associated with the virtual memory address. After reading the PSD 210, the CPU fault handler 211 determines that the current ownership state for the memory page associated with the virtual memory address is PPU-owned. Based on the current ownership state, as well as other factors, such as usage characteristics for the page or the type of access, the CPU fault handler 211 determines that a new ownership state for the page is CPU-owned.

The CPU fault handler 211 changes the ownership state associated with the memory page to CPU-owned. The CPU fault handler 211 writes a command into the command queue 214 to cause the copy engine 212 to remove the entry from the PPU page table 208 that associates the virtual memory address with the memory page. Various TLB entries may be invalidated. The CPU fault handler 211 also copies the memory page from the PPU memory 204 into the system memory 104, which may be done via the command queue 214 and the copy engine 212. The CPU fault handler 211 writes a page table entry into the CPU page table 206 that associates the virtual memory address with the memory page that is copied into the system memory 104. The CPU fault handler 211 also updates the PSD 210 to associate the virtual memory address with the newly copied memory page. At this point, the page fault sequence is complete. The ownership state for the memory page is CPU-owned, meaning that the memory page is accessible only to the CPU 102. Only the CPU page table 206 includes an entry that associates the virtual memory address with the memory page.

A fault by the CPU 102 may initiate a transition from PPU-owned to CPU-shared. Prior to such a transition, an operation executing in the CPU 102 attempts to access memory at a virtual memory address that is not mapped in the CPU page table 206, which causes a CPU-based page fault. The CPU fault handler 211 reads the PSD 210 entry corresponding to the virtual memory address and identifies the memory page associated with the virtual memory address. After reading the PSD 210, the CPU fault handler 211 determines that the current ownership state for the memory page associated with the virtual memory address is PPU-owned. Based on the current ownership state or the type of access, as well as other factors, such as usage characteristics for the page, the CPU fault handler 211 determines that a new ownership state for the memory page is CPU-shared.

The CPU fault handler 211 changes the ownership state associated with the memory page to CPU-shared. The CPU fault handler 211 writes a command into the command queue 214 to cause the copy engine 212 to remove the entry from the PPU page table 208 that associates the virtual memory address with the memory page. Various TLB entries may be invalidated. The CPU fault handler 211 also copies the memory page from the PPU memory 204 into the system memory 104. This copy operation may be done via the command queue 214 and the copy engine 212. The CPU fault handler 211 then writes a command into the command queue 214 to cause the copy engine 212 to change the entry in PPU page table 208 such that the virtual memory address is associated with the memory page in the system memory 104. Various TLB entries may be invalidated. The CPU fault handler 211 writes a page table entry into the CPU page table 206 to associate the virtual memory address with the memory page in the system memory 104. The CPU fault handler 211 also updates the PSD 210 to associate the virtual memory address with the memory page in system memory 104. At this point, the page fault sequence is complete. The ownership state for the page is CPU-shared, and the memory page has been copied into the system memory 104. The page is accessible to the CPU 102, since the CPU page table 206 includes an entry that associates the virtual memory address with the memory page in the system memory 104. The page is also accessible to the PPU 202, since the PPU page table 208 includes an entry that associates the virtual memory address with the memory page in the system memory 104.

Detailed Example of a Page Fault Sequence

With this context, a detailed description of a page fault sequence executed by the PPU fault handler 215 in the event of a transition from CPU-owned to CPU-shared is now provided to show how atomic operations and transition states may be used to more effectively manage a page fault sequence. The page fault sequence is triggered by a PPU 202 thread attempting to access a virtual address for which a mapping does not exist in the PPU page table 208. When a thread attempts to access data via a virtual memory address, the PPU 202 (specifically, a user-level thread) requests a translation from the PPU page table 208. A PPU page fault occurs in response because the PPU page table 208 does not include a mapping associated with the requested virtual memory address.

After the page fault occurs, the thread enters a trap, stalls, and the PPU fault handler 215 executes a page fault sequence. The PPU fault handler 215 reads the PSD 210 to determine which memory page is associated with the virtual memory address and to determine the state for the virtual memory address. The PPU fault handler 215 determines, from the PSD 210, that the ownership state for that memory page is CPU-owned. Consequently, the data requested by the PPU 202 is inaccessible to the PPU 202 via a virtual memory address. State information for the memory page also indicates that the requested data cannot be migrated to the PPU memory 204.

Based on the state information obtained from the PSD 210, the PPU fault handler 215 determines that a new state for the memory page should be CPU-shared. The PPU fault handler 215 changes the state to "transitioning to CPU-shared." This state indicates that the page is currently in the process of being transitioned to CPU-shared. When the PPU fault handler 215 runs on a microcontroller in the memory management unit, then two processors will update the PSD 210 asynchronously, using atomic compare-and-swap ("CAS") operations on the PSD 210 to change the state to "transitioning to GPU visible," (CPU-shared).

The PPU 202 updates the PPU page table 208 to associate the virtual address with the memory page. The PPU 202 also invalidates the TLB cache entries. Next, the PPU 202 performs another atomic compare-and-swap operation on the PSD 210 to change the ownership state associated with the memory page to CPU-shared. Finally, the page fault sequence ends, and the thread that requested the data via the virtual memory address resumes execution.

Fault Buffer

Resolution of page faults generated by the CPU 102 do not involve the fault buffer 216. However, resolution of page faults generated by the PPU MMU 213 involve the fault buffer 216. The role of the fault buffer 216 in resolving page faults generated by the PPU MMU 213 is described below in more detail with respect to FIGS. 5 and 6.

Figure 5:
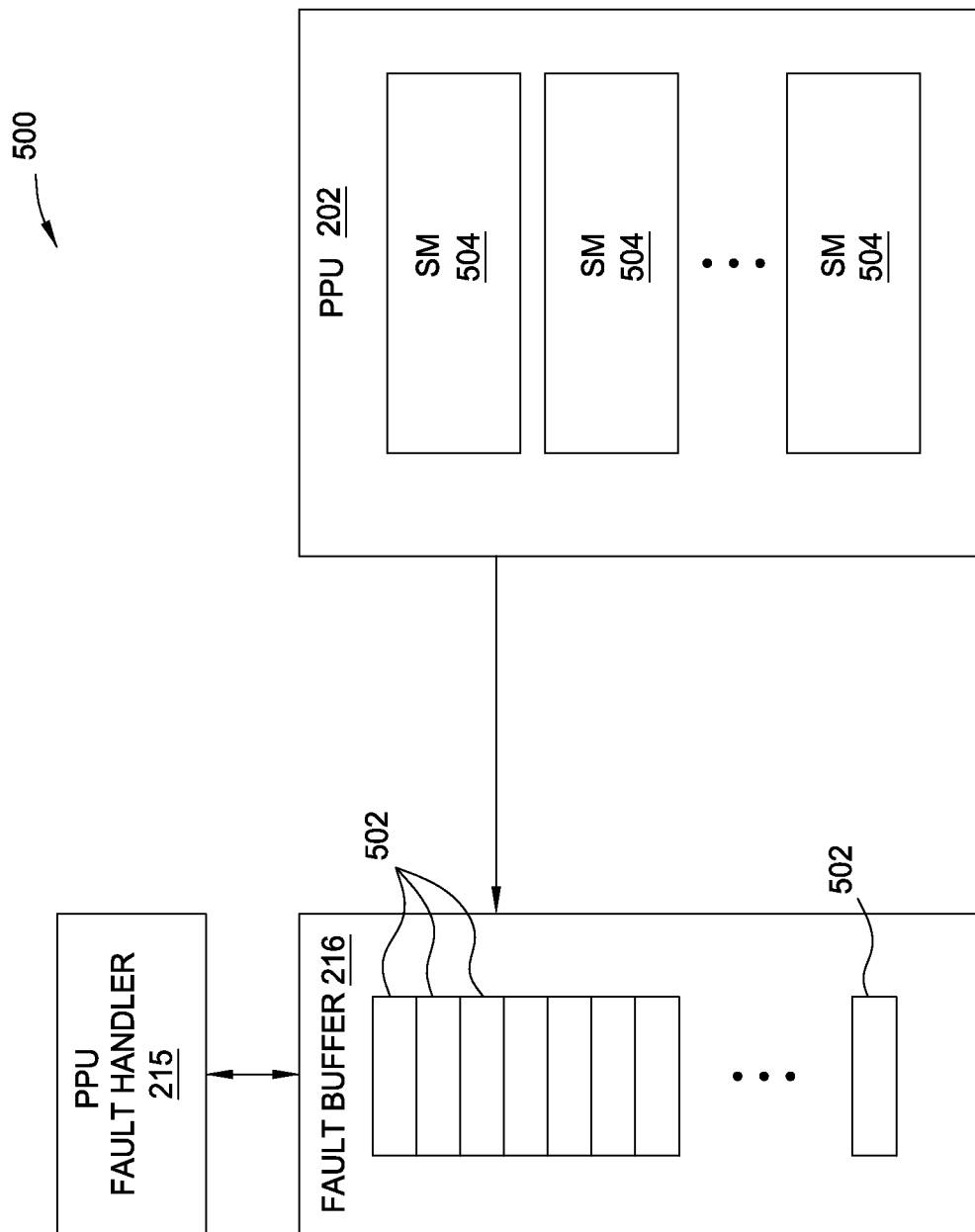
FIG. 5 illustrates a virtual memory system for storing faults in a fault buffer, according to one embodiment of the present invention.

FIG. 5 illustrates a virtual memory system 500 for storing faults in a fault buffer, according to one embodiment of the present invention. As shown, the virtual memory system 500 includes a PPU fault handler 215, a fault buffer 216, and a PPU 202, including multiple streaming multiprocessors 504.

The fault buffer 216 stores fault buffer entries 502 that indicate information related to page faults generated by the PPU 202. Fault buffer entries 502 may include, for example, the type of access that was attempted (e.g., read, write, or atomic), the virtual memory address for which an attempted access caused a page fault, the virtual address space, and an indication of a unit or thread that caused a page fault. In operation, when the PPU 202 causes a page fault, the PPU 202 may write a fault buffer entry 502 into the fault buffer 216 to inform the PPU fault handler 215 about the faulting memory page and the type of access that caused the fault. The PPU fault handler 215 then performs actions to remedy the page fault. The fault buffer 216 can store multiple faults because the PPU 202 is executing a plurality of threads, where each thread can cause a one or more faults due the pipelined nature of the memory accesses of the PPU 202. Each of the fault buffer entries 502 may be generated by one or more streaming multiprocessors 504, which are included within PPU 202.

Figure 6:
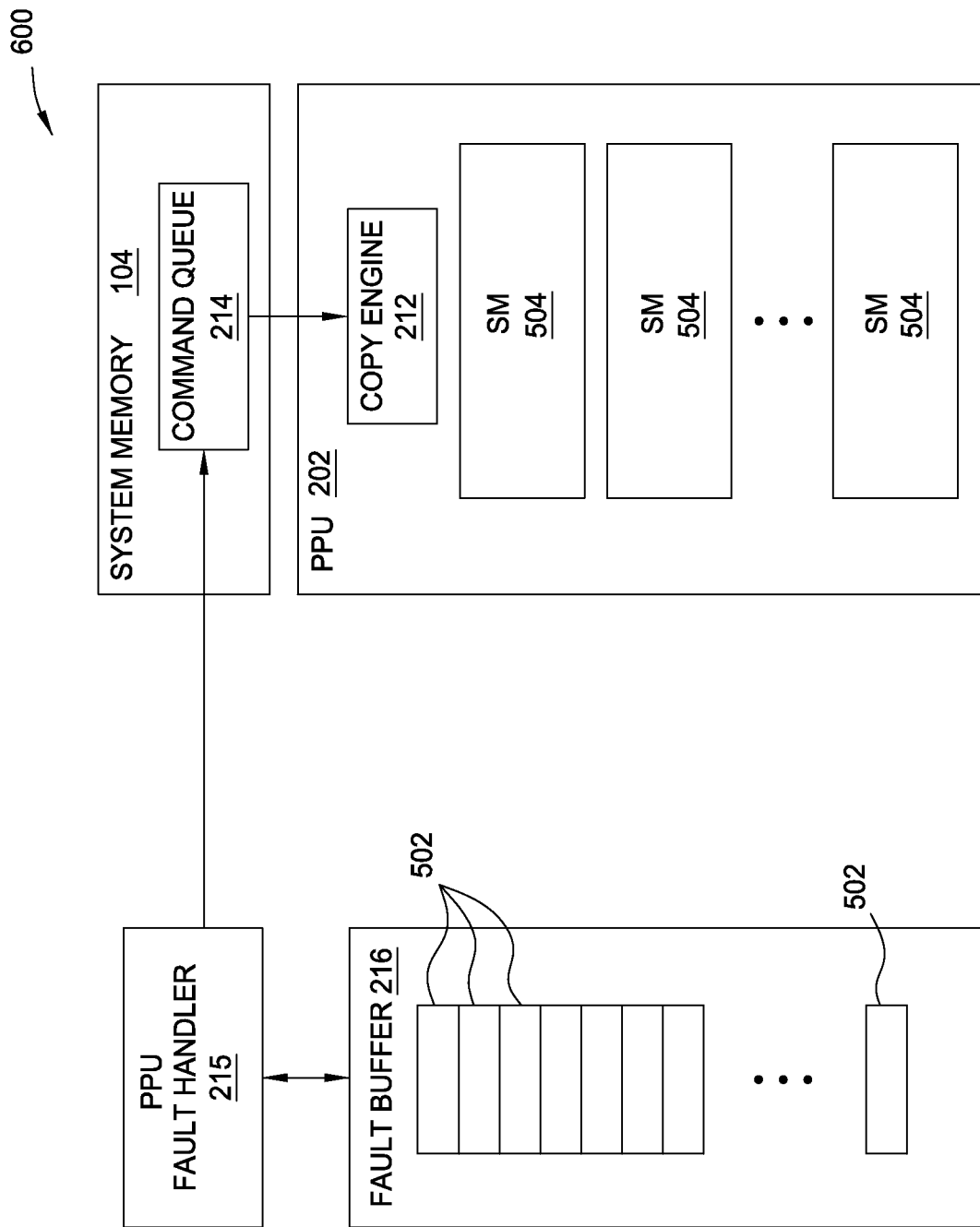
FIG. 6 illustrates a virtual memory system for resolving page faults generated by PPU, according to one embodiment of the present invention.

FIG. 6 illustrates a virtual memory system 600 for resolving page faults generated by PPU 202, according to one embodiment of the present invention. As shown, the virtual memory system 600 includes a PPU fault handler 215, a fault buffer 216, a system memory 104 including a command queue 214, and a PPU 202 including a copy engine 212.

The PPU fault handler 215 reads fault buffer entries 502 stored in the fault buffer 216 to determine how to resolve the page faults associated with the fault buffer entries 502. To resolve the page faults, the PPU fault handler 215 executes a page fault sequence to, among other things, modify a PSD entry associated with memory pages corresponding to the fault buffer entries 502, and/or migrate memory pages associated with the fault buffer entries 502. During a page fault sequence, the CPU 102 or the PPU 202 may write commands into the command queue 214 for execution by the copy engine 212. Such an approach frees up the CPU 102 or the PPU 202 to execute other tasks while the copy engine 212 reads and executes the commands stored in the command queue 214, and allow all the commands for a fault sequence to be queued at one time, thereby avoiding the monitoring of progress of the fault sequence. Commands executed by the copy engine 212 may include, among other things, deleting, creating, or modifying page table entries in the PPU page table 208, reading or writing data from the system memory 104, and reading or writing data to the PPU memory 204.

CPU 102 and PPU 202 can context switch separately. In other words, a PPU 202 can write a fault buffer entry into fault buffer 216 in response to detecting a fault. This fault buffer may not be immediately resolved by the PPU fault handler 215 in the CPU. Instead, the CPU 102 may perform other processing tasks, and handle the PPU fault eventually. Thus, the CPU 102 and PPU 202 may not necessarily operate in the same context simultaneously. In other words, the CPU 102 may be executing a process that is different from the process that spawned the work that is currently executing on the PPU 202. To inform the PPU fault handler 215 of which process is associated with the PPU 202 work that generated a fault buffer entry 502, the PPU 202 provides an instance pointer with the fault buffer entry to inform the CPU 102 of the address space in which the PPU 202 caused the fault. The fault buffer 216 may include several page fault entries associated with the same memory page, because multiple streaming multiprocessors 504 are running in parallel and can generate page faults directed to the same memory page. The PPU fault handler 215 examines the fault buffer 216 to determine which faults to resolve.

UVM System Architecture Variations

Various modifications to the unified virtual memory system 200 are possible. For example, in some embodiments, after writing a fault buffer entry into the fault buffer 216, the PPU 202 may trigger a CPU interrupt to cause the CPU 102 to read fault buffer entries in the fault buffer 216 and perform whatever operations are appropriate in response to the fault buffer entry. In other embodiments, the CPU 102 may periodically poll the fault buffer 216. In the event that the CPU 102 finds a fault buffer entry in the fault buffer 216, the CPU 102 executes a series of operations in response to the fault buffer entry.

In some embodiments, the system memory 104, rather than the PPU memory 204, stores the PPU page table 208. In other embodiments, a single or multiple-level cache hierarchy, such as a single or multiple-level translation look-aside buffer (TLB) hierarchy (not shown), may be implemented to cache virtual address translations for either the CPU page table 206 or the PPU page table 208.

In yet other embodiments, in the event that a thread executing in the PPU 202 causes a PPU fault (a "faulting thread"), the PPU 202 may take one or more actions. These actions include: stall the entire PPU 202, stall the SM executing the faulting thread, stall the PPU MMU 213, stall only the faulting thread, stall a group of threads that include the faulting thread, or stall one or more levels of TLBs. In some embodiments, after a PPU page fault occurs, and a page fault sequence has been executed by the unified virtual memory system 200, execution of the faulting thread resumes, and the faulting thread attempts, again, to execute the memory access request that caused the page fault. In some embodiments, stalling at a TLB is done in such a way as to appear as a long-latency memory access to the faulting SM or faulting thread, thereby not requiring the SM to do any special operation for a fault.

Finally, in other alternative embodiments, the UVM driver 101 may include instructions that cause the CPU 102 to execute one or more operations for managing the UVM system 200 and remedying a page fault, such as accessing the CPU page table 206, the PSD 210, and/or the fault buffer 216. In other embodiments, an operating system kernel (not shown) may be configured to manage the UVM system 200 and remedy a page fault by accessing the CPU page table 206, the PSD 210, and/or the fault buffer 216. In yet other embodiments, an operating system kernel may operate in conjunction with the UVM driver 101 to manage the UVM system 200 and remedy a page fault by accessing the CPU page table 206, the PSD 210, and/or the fault buffer 21.

Figure 7:
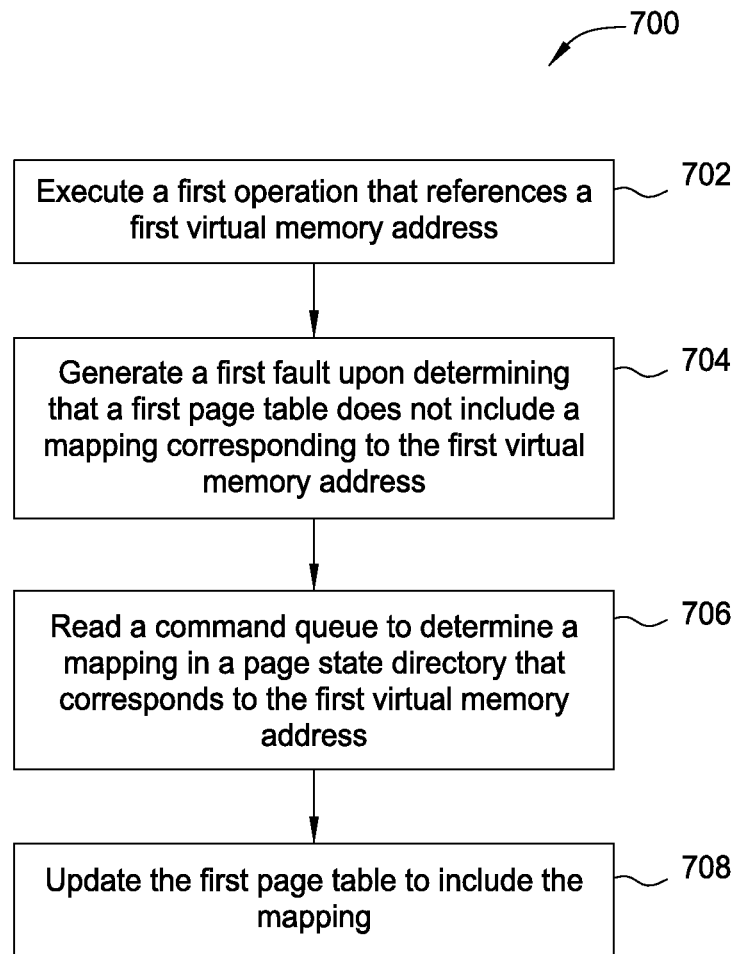
FIG. 7 sets forth a flow diagram of method steps for managing virtual memory to physical memory mappings via a page state directory, according to one embodiment of the present invention.

FIG. 7 sets forth a flow diagram of method steps for managing virtual memory to physical memory mappings via a page state directory, according to one embodiment of the present invention. Although the method steps are described in conjunction with FIGS. 1-6, persons skilled in the art will understand that any system configured to perform the method steps, in any order, falls within the scope of the present invention.

As shown, the method 700 begins at step 702, where a PPU 202 executes a first operation that references a first virtual memory address. In step 704, the PPU MMU 213 reads PPU page table 208 and determines that the PPU page table 208 does not include a mapping associated with the first virtual memory address. The PPU MMU 213 generates a first page fault upon making this determination. In step 706, after the PPU fault handler 215 resolves the page fault and places commands in the command queue 214, the copy engine 212 in the PPU 202 reads the command queue 214 to determine a mapping that corresponds to the first virtual memory address. In step 708, the copy engine 212 updates the PPU page table 208 to include the mapping.

Figure 8:
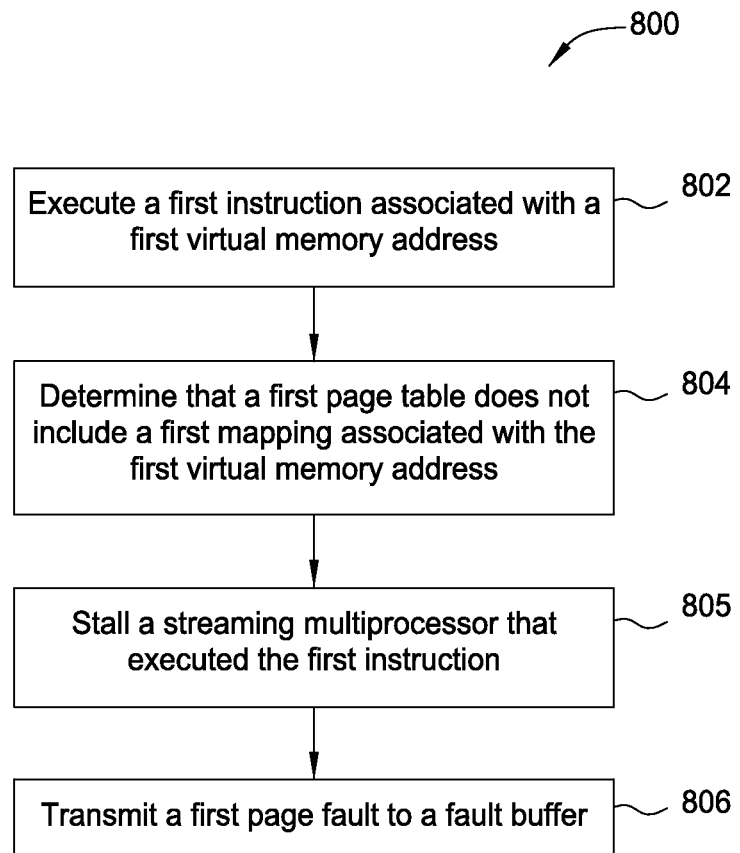
FIG. 8 sets forth a flow diagram of method steps for tracking page faults, according to one embodiment of the present invention.

FIG. 8 sets forth a flow diagram of method steps for tracking page faults, according to one embodiment of the present invention. Although the method steps are described in conjunction with FIGS. 1-6, persons skilled in the art will understand that any system configured to perform the method steps, in any order, falls within the scope of the present invention.

As shown, the method 800 begins at step 802, where a PPU 202 executes a first instruction associated with a first virtual memory address. In step 804, the PPU MMU 213 determines that the PPU page table 208 does not include a first mapping associated with the first virtual memory address. In step 805, the streaming multiprocessor 504 or other unit that executed the first instruction is stalled. In step 806, the PPU 202 transmits a first page fault to the fault buffer 216.

Figure 9:
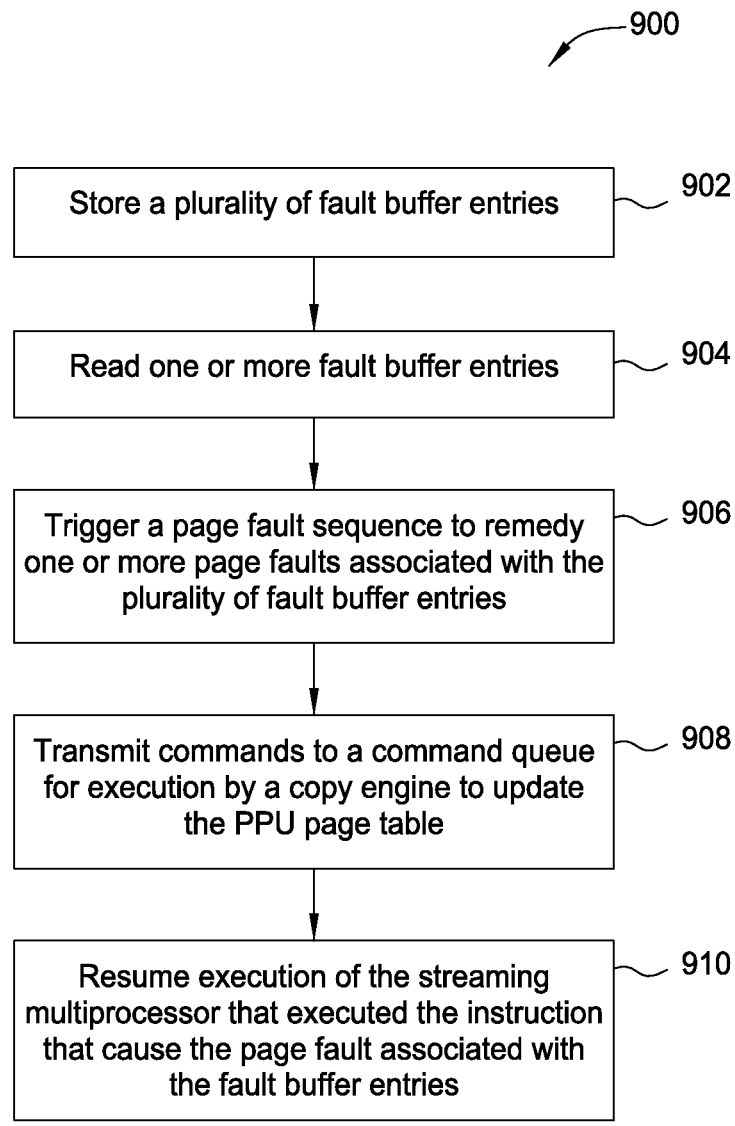
FIG. 9 sets forth a flow diagram of method steps for resolving page faults with a fault buffer, according to one embodiment of the present invention.

FIG. 9 sets forth a flow diagram of method steps for resolving page faults with a fault buffer, according to one embodiment of the present invention. Although the method steps are described in conjunction with FIGS. 1-6, persons skilled in the art will understand that any system configured to perform the method steps, in any order, falls within the scope of the present invention.

As shown, the method 900 begins in step 902, where a fault buffer 216 stores a plurality of fault buffer entries. In step 904, a PPU fault handler 215 reads the fault buffer entries to resolve the fault buffer entries. In step 906, the PPU fault handler 215 determines what steps are to be taken to resolve the fault buffer, and triggers a page fault sequence to remedy one or more page faults associated with the fault buffer entries. In step 908, the PPU fault handler 215 transmits commands to a command queue 214 to update the PPU page table 208. In step 910, the streaming multiprocessor 504 or other unit that was stalled resumes execution.

Figure 10:
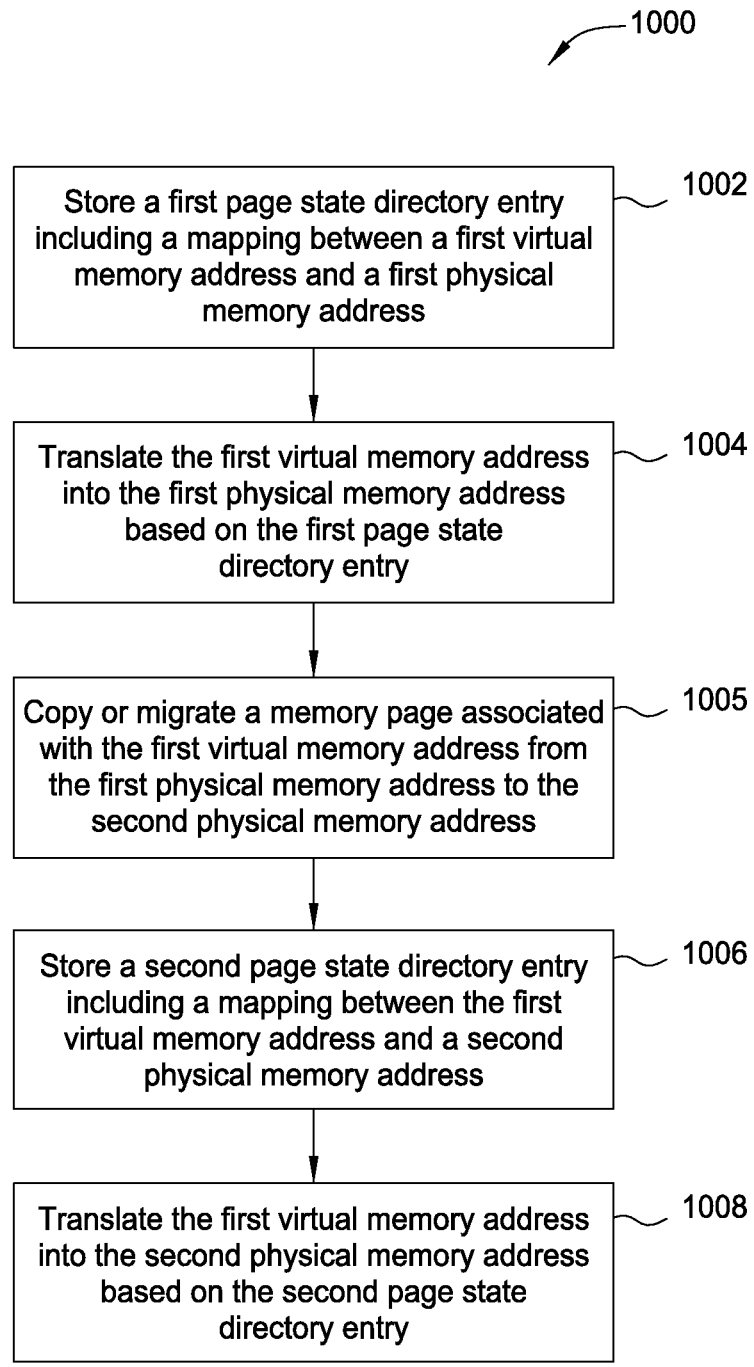
FIG. 10 sets forth a flow diagram of method steps for creating and managing common pointers in a virtual memory architecture, according to one embodiment of the present invention.

FIG. 10 sets forth a flow diagram of method steps for creating and managing common pointers in a virtual memory architecture, according to one embodiment of the present invention. Although the method steps are described in conjunction with FIGS. 1-6, persons skilled in the art will understand that any system configured to perform the method steps, in any order, falls within the scope of the present invention.

As shown, the method 1000 begins in step 1002, where UVM driver 101 stores a first page state directory entry that includes a mapping between a first virtual memory address and a first physical memory address. In step 1004, either CPU MMU 209 or PPU MMU 213 translates the first virtual memory address into the first physical address based on the first page state directory. In step 1005, a memory page associated with the first virtual address is copied or migrated. In step 1006, UVM driver 101 stores a second page state directory entry (or alternatively modifies the first page state directory entry) that includes a mapping between the first virtual memory address and a second physical memory address. This second page directory entry is stored in response to modifying the state of the memory page associated with the first page state directory entry. For example, the memory page may be migrated from one memory unit to another, or may be copied from one memory unit to another. In step 1008, either CPU MMU 209 or PPU MMU 213 translates the first virtual memory address into the second physical memory address based on the second page state directory entry.

Figure 11:
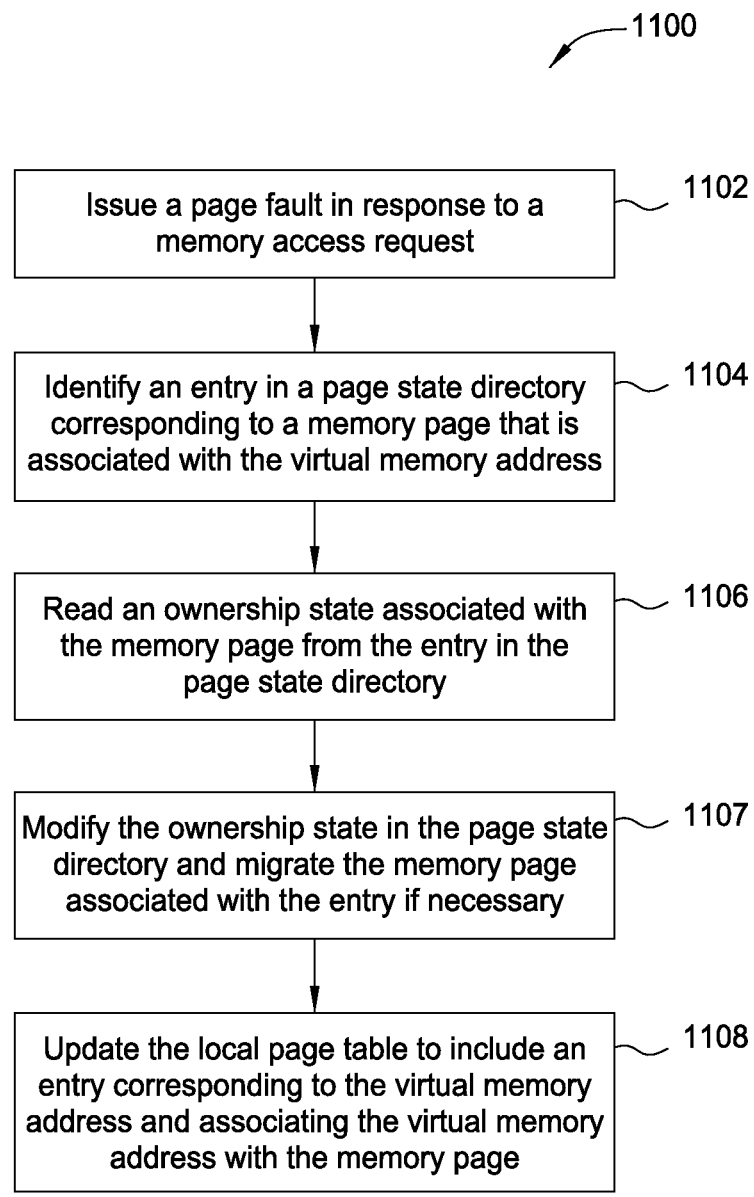
FIG. 11 sets forth a flow diagram of method steps for managing ownership state in a virtual memory subsystem, according to one embodiment of the present invention.

FIG. 11 sets forth a flow diagram of method steps for managing ownership state in a virtual memory subsystem, according to one embodiment of the present invention. Although the method steps are described in conjunction with FIGS. 1-6, persons skilled in the art will understand that any system configured to perform the method steps, in any order, falls within the scope of the present invention.

As shown, the method 1100 begins in step 1102, where either CPU MMU 209 or PPU MMU 213 issues a page fault in response to a memory access request by either CPU 102 or PPU 202, respectively. In step 1104, either CPU fault handler 211 or PPU fault handler 215 identifies an entry in a page state directory 210 corresponding to a memory page that is associated with the virtual memory address. In step 1107, the ownership state of the memory page in the page state directory 210 is modified and the memory page is migrated if necessary. In step 1106, the CPU fault handler 211 or PPU fault handler 215 reads an ownership state associated with the memory page from the entry in the page state directory 210. In step 1108, the CPU fault handler 211 or PPU fault handler 215 updates the local page table to include an entry corresponding to the virtual memory address, and associating the virtual memory address with the memory page.

In sum, a unified virtual memory system is provided that manages memory in a shared manner between a CPU and one or more PPUs. The unified virtual memory system includes a page state directory that stores mappings included in both a page table associated with the CPU and a page table associated with the PPU. When either a PPU or a CPU triggers a page fault, the page state directory is available to provide the state of memory pages associated with the page fault. Additionally, when a PPU triggers a page fault, the PPU transmits a page fault to a fault buffer. The PPU fault handler, examines the contents of the fault buffer to resolve the page faults. Providing a fault buffer allows the PPU fault handler to "coalesce" page faults executed by the PPU. Additionally, a unified virtual memory driver manages the page state directory and associated virtual memory addresses such that virtual memory addresses are common between both the CPU and the PPU. Finally, the unified virtual memory driver implements a migration scheme that migrates memory pages based on usage by the CPU and PPU.

One advantage of the disclosed approach is that user-level applications do not need to keep track of multiple pointers depending on where a particular piece of data is stored. An additional advantage is that memory pages are migrated between memory units based on usage, which allows memory pages to be located local to units that access the memory pages more frequently. Another advantage is that a fault buffer is provided that allows faults generated by the PPU to be coalesced for efficient execution.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A system for tracking page faults, the system comprising:
  a central processing unit (CPU) comprising a CPU memory management unit (MMU);
  a system memory that is coupled to the CPU and stores a CPU page table;
  a parallel processing unit (PPU) comprising a PPU MMU, a first streaming multiprocessor, and a second streaming multiprocessor, wherein the CPU and the PPU are separate processing entities;
  a PPU memory that is coupled to the PPU and stores a PPU page table,
  wherein the PPU:
    executes a first instruction that is associated with a first virtual memory address,
    determines that the PPU page table stored in the PPU memory does not include a first mapping associated with the first virtual memory address, and
    transmits a first fault buffer entry to a fault buffer stored in the system memory in response to determining that the PPU page table stored in the PPU memory does not include the first mapping,
    wherein the fault buffer stored in the system memory stores fault buffer entries that are received from only the PPU and are associated with page faults generated by the PPU, the fault buffer including both the first fault buffer entry and a second fault buffer entry at a first point in time, the first fault buffer entry including an indication that the first streaming multiprocessor caused a corresponding page fault, and the second fault buffer entry including an indication that the second streaming multiprocessor caused a corresponding page fault.

2. The system of claim 1, wherein:
  the first streaming multiprocessor executes the first instruction;

the second streaming multiprocessor executes a second instruction that is associated with a second virtual memory address; and the PPU MMU determines that the PPU page table does not include a second mapping associated with the second virtual memory address, and, in response, transmits the second fault buffer entry to the fault buffer.

3. The system of claim 2, wherein:

the first streaming multiprocessor stalls in response to the PPU MMU determining that the PPU page table does not include the first mapping; and the second streaming multiprocessor stalls in response to the PPU MMU determining that the PPU page table does not include the second mapping.

4. The system of claim 3, wherein the first streaming multiprocessor resumes execution and attempts to execute the first instruction again, and the second streaming multiprocessor resumes execution and attempts to execute the second instruction again.

5. The system of claim 1, wherein the CPU executes a first page fault sequence to resolve a page fault associated with the first fault buffer entry.

6. The system of claim 5, further comprising a command queue, wherein executing the first page fault sequence includes transmitting one or more commands to the command queue, the one or more commands causing the PPU to execute a first set of operations associated with the first page fault sequence.

7. The system of claim 6, wherein the PPU further includes a copy engine that executes the first set of operations.

8. The system of claim 7, wherein the copy engine executes a first operation included in the first set of operations to modify the PPU page table to include the first mapping.

9. The system of claim 1, wherein the PPU comprises a plurality of streaming multiprocessors that includes the first streaming multiprocessor and the second streaming multiprocessor, and each fault buffer entry included in the plurality of fault buffer entries comprises an indication of which streaming multiprocessor included in the plurality of streaming multiprocessors caused a corresponding page fault.

10. The system of claim 1, wherein a fault handler executed by the CPU resolves page faults associated with one or more fault buffer entries stored in the fault buffer by issuing commands that are transmitted to the PPU and cause the PPU to execute a copy engine that resolves the page faults.

11. A computing system for tracking page faults, the computing system comprising:

a central processing unit (CPU) comprising a CPU memory management unit (MMU);

a system memory that is coupled to the CPU and stores a CPU page table;

a parallel processing unit (PPU) memory storing a parallel processing unit (PPU) page table; and a parallel processing unit (PPU) comprising a PPU memory management unit (MMU), wherein the PPU memory is coupled to the PPU, and the CPU and the PPU are separate processing entities, wherein the PPU:

executes a first instruction that is associated with a first virtual memory address, determines that the PPU page table stored in the PPU memory does not include a first mapping associated with the first virtual memory address, and transmits a first fault buffer entry to a fault buffer stored in the system memory in response to determining that the PPU page table stored in the PPU memory does not include the first mapping, wherein the fault buffer stored in the system memory stores fault buffer entries that are received from only the PPU and are associated with page faults generated by the PPU, the first fault buffer entry includes an indication that a first streaming multiprocessor included in the PPU caused a corresponding page fault, and a second fault buffer entry includes in the fault buffer includes an indication that a second streaming multiprocessor included in the PPU caused a corresponding page fault.

12. The computing device of claim 11, wherein:

the first streaming multiprocessor included in the PPU executes the first instruction;

the second streaming multiprocessor included in the PPU executes a second instruction that is associated with a second virtual memory address; and the PPU MMU determines that the PPU page table does not include a second mapping associated with the second virtual memory address, and, in response, transmits the second fault buffer entry to the fault buffer.

13. The computing device of claim 12, wherein:

the first streaming multiprocessor stalls in response to the PPU MMU determining that the PPU page table does not include the first mapping; and the second streaming multiprocessor stalls in response to the PPU MMU determining that the PPU page table does not include the second mapping.

14. The computing device of claim 13, wherein the first streaming multiprocessor resumes execution and attempts to execute the first instruction again, and the second streaming multiprocessor resumes execution and attempts to execute the second instruction again.

15. The computing device of claim 11, further comprising a command queue that stores one or more commands associated with a page fault sequence that resolves a page fault associated with the first fault buffer entry.

16. The computing device of claim 15, wherein the PPU further includes a copy engine that executes the one or more commands.

17. A method for tracking page faults, the method comprising:

executing, via a parallel processing unit (PPU), a first instruction that is associated with a first virtual memory address;

determining, via a PPU memory management unit (MMU) included in the PPU, that a PPU page table does not include a first mapping associated with the first virtual memory address, wherein the PPU page table is stored in a PPU memory that is coupled to the PPU; and transmitting, via the PPU MMU, a first fault buffer entry to a fault buffer in response to determining that the PPU page table stored in the PPU memory does not include the first mapping, wherein the fault buffer is stored in a system memory that is coupled to a central processing unit (CPU), wherein the CPU and the PPU are separate processing entities, wherein the fault buffer stored in the system memory stores fault buffer entries that are received from only the PPU and are associated with page faults generated by the PPU, the fault buffer including both the first fault buffer entry and a second fault buffer entry at a first point in time, the first fault buffer entry including an indication that a first streaming multiprocessor included in the PPU caused a corresponding page fault, and the second fault buffer entry including an indication that a second streaming multiprocessor included in the PPU caused a corresponding page fault.

18. The method of claim 17, further comprising executing, via the central processing unit (CPU), a page fault sequence to resolve a page fault associated with the first fault buffer entry.

19. The method of claim 18, wherein executing the first page fault sequence includes transmitting one or more commands to a command queue, the one or more commands causing the PPU to execute a first set of operations associated with the first page fault sequence.

20. The method of claim 19, further comprising executing a first operation included in the first set of operations to modify the PPU page table to include the first mapping.

* * * * *